United States Patent Office 2,776,307
Patented Jan. 1, 1957

2,776,307

POLYGLYCOL SILICATES

Andrew D. Abbott, Ross, and Robert O. Bolt, San Rafael, Calif., assignors to California Research Corporation, San Francisco, Calif., a corporation of Delaware No Drawing. Application December 30, 1953,
Serial No. 401,402

11 Claims. (Cl. 260—448.8)

This invention is directed to the provision of novel silicon esters, and it is particularly directed to the provision of derivatives of certain polyglycols wherein the terminal hydroxy groups are replaced by trialkoxysiloxy radicals. These compounds have excellent viscosity and temperature-viscosity characteristics and are well adapted for employment as hydraulic fluids and for other lubricant purposes.

The compounds of this invention are of the type having the general formula:

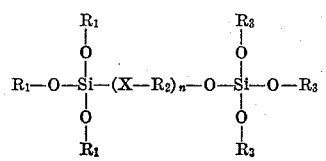

where X represents an oxy, thio, or imino (—$NR_4$—, $R_4$ being $H_+$ or an alkyl radical) group, the $R_1$'s and the $R_3$ represent saturated aliphatic radicals of from 1 to 16 carbon atoms each, $R_2$ represents an ethylene (—$CH_2CH_2$—)

or a propylene [—$CH_2.(CH_3)CH$—] radical, and $n$ represents an integer having a value of 2, 3 or 4. The various $R_1$'s may represent the same or different radicals, and the same is true of the $R_3$ radicals. Representative $R_1$, $R_3$ and $R_4$ radicals are methyl, ethyl, isopropyl, sec.-butyl, tert.-butyl, amyl, isoamyl, tert.-amyl, cyclopentyl, cyclohexyl, 2-ethylbutyl, 2-ethylhexyl, octyl, decyl, dodecyl and the like.

The silicate esters of this invention have a low pour point and good viscosity and viscosity index properties, coupled with low volatility even at high temperatures. Thus, the present compounds are adapted to be used at temperatures even below —65° F., while their viscosity at 210° F. is unusually good, i. e., from about 2.0 to 10 Cs. The A. S. T. M. slope of the viscosity-temperature curves of the present compounds is from about 0.65 to 0.70 as measured from —65° to 210° F., which relatively low slope values are indicative of correspondingly high viscosity-index qualities.

In view of the foregoing properties, and since the present compounds are somewhat combustion resistant, it is obvious that said compounds are well adapted to be used as synthetic lubricants, and particularly as hydraulic fluids. However, in those applications where it is important that the silicate ester be highly resistant to deterioration in the presence of water, those compounds should be chosen wherein at least one each of said $R_1$ and $R_3$ radicals in the structural formula given above is a secondary, tertiary, or branched-chain primary alkyl radical of from 3 to 16 carbon atoms, and more preferably, all the $R_1$ and $R_3$ radicals are of this character. It is also preferred that $R_4$ be a lower ($C_1$–$C_6$) alkyl group and that $n$ have a value of 2. The following compounds are representative of those falling within the scope of this invention.

Dialkylene glycol silicates:
  1,5-bis(trimethoxysiloxy)-3-oxapentane
  1,5-bis[tri(2-butoxy)siloxy]-3-oxapentane
  1,5-bis[tri(2-ethylhexoxy)siloxy]-3-oxapentane
  1-(triethoxysiloxy) - 5 - [tri(2 - butoxy)siloxy] - 3 - oxapentane
  1,5-bis[tri-(2-butoxy)siloxy]-3-thiapentane
  1,5-bis[tri-(2-butoxy)siloxy]-3-azapentane
  1,5-bis[tri(2-butoxy)siloxy]-3-methyl-3-azapentane
  1,5-bis(triethoxysiloxy)-1,4-dimethyl-3-oxapentane
  1,5-bis(triethoxysiloxy)-1,4-dimethyl-3-thiapentane
  1,5-bis(triethoxysiloxy)-1,4-dimethyl-3-azapentane
  1,5 - bis[tri(2 - butoxy)siloxy] - 1,4 - dimethyl - 3 - oxapentane
  1,5 - bis[tri(2 - butoxy)siloxy] - 2,4 - dimethyl - 3 - oxapentane
  1,5 - bis[tri(2 - butoxy)siloxy] - 1,4 - dimethyl - 3 - thiapentane
  1 - [tri(2 - ethylhexoxy)siloxy] - 5 - [tri(2 - butoxy)siloxy] - 1,4 - dimethyl - 3 - oxapentane
  1 - [tri(2 - ethylhexoxy)siloxy] - 5 - [tri(2 - butoxy)siloxy] - 2,4 - dimethyl - 3 - oxapentane Trialkylene glycol silicates:
  1,8-bis[tri(2-butoxy)siloxy]-3,6-dioxaoctane
  1,8-bis[tri(2-butoxy)siloxy]-3,6-dithiaoctane
  1,8-bis(trimethoxysiloxy)-3,6-dioxaoctane
  1 - [tri(2 - ethylhexoxy)siloxy] - 8 - [tri(2 - butoxy)siloxy] - 3,6 - dioxaoctane
  1,8-bis[tri(tert.-butoxy)siloxy]-3,6-dioxaoctane
  1,8-bis[tri(tert.-butoxy)siloxy]-3,6-dithiaoctane
  1,8-bis[tri(tert.-butoxy)siloxy]-3,6-diazaoctane
  1-[tri(2 - butoxy)siloxy] - 8 -[tri(tert. - butoxy) - siloxy] - 3,6 - dioxaoctane
  1,8 - bis[tri(2 - butoxy)siloxy] - 1,4,7 - trimethyl - 3,6 - dioxaoctane Tetraalkylene glycol silicates:
  1,11 - bis[tri(2 - butoxy)siloxy] - 3,6,9 - trioxahendecane
  1,11 - bis[tri(2 - butoxy)siloxy] - 1,4,7,10 - tetramethyl - 3,6,9 - trioxahendecane
  1,11-bis(triethoxysiloxy)-3,6,9-trioxahendecane
  1,11 - bis[tri(2 - butoxy)siloxy] -3,6,9 - trithiahendecane Mixed ethylene-propylene glycol silicates:
  1,5 - bis[tri(2 - butoxy)siloxy] - 3 - oxa - 4 - methylpentane
  1 - [tri(2 - butoxy)siloxy] - 5 - (triethoxysiloxy) - 3 - oxa - 4 - methylpentane
  1 - [tri(2 - butoxy)siloxy] - 5 - [tri(tert. - butoxy) - siloxy] - 3 - oxa - 4 - methylpentane
  1,5 - bis[tri(2 - butoxy)siloxy] - 3 - thia - 4 - methylpentane
  1,5 - bis[tri(2 - butoxy)siloxy] - 3 - aza - 4 - methylpentane Miscellaneous mixed polyglycol silicates:
  1,8 - bis[tri(2 - butoxy)siloxy] - 3 - oxa - 6 - thia - octane
  1 - [tri(2 - butoxy)siloxy] - 8 - [tri(2 - ethylhexoxy) - siloxy] - 3 - oxa - 6 - thiaoctane
  1,8 - bis[tri(2 - butoxy)siloxy] - 3 - methyl - 3 - aza - 6 - oxaoctane The ester compounds of this invention can readily be prepared by the application of conventional methods of organic syntheses. As a general rule, however, the first step is to react the desired primary, secondary and/or tertiary alcohol with silicon tetrachloride in the molar proportions required to form the trialkoxymonochlorosilane. With primary and secondary alcohols this reaction readily takes place even at temperatures below 0° F., while with tertiary alcohols, the recommended procedure is to add the alcohol along with pyridine to a cooled solution of SiCl₄ in toluene (preferably maintained below 0° F. to minimize loss of SiCl₄ by evaporation), with the reaction then being completed by refluxing the mixture. When the R₁ and R₃ groups are to be the same, the ester end product can then be formed by condensing the trialkoxymonochlorosilane with the desired polyglycol (preferably in the presence of pyridine, ammonia or other acid acceptor). When the R₃ groups are to be different from the R₁ groups, a possible procedure is to first react one-half of the hydroxy groups of the polyglycol with one of the trialkoxychlorosilane compounds, with the remaining portion of said hydroxy groups then being condensed with other trialkoxychlorosilane derivatives. However, since mixtures of esters of the type described herein are highly useful, the preferred practice when employing different trialkoxychlorosilane compounds is to react the same simultaneously with the polyglycol. The mixture of polyglycol silicates formed in this manner can either be used as such, or it can be separated into two or more of its component fractions, with each separated portion then being used for hydraulic purposes or otherwise.

While, as indicated above, the silicon esters of this invention can be used alone for hydraulic fluid and other purposes, good results are also obtained with compositions wherein the present esters are blended with a minor percentage of other additive compounds. Thus, the oxidative stability of the present esters can be increased by the use of from 0.1 to 10% by weight of an anti-oxidant, e. g., phenyl-α-naphthylamine, p-hydroxydiphenylamine, tertiary butylcatechol or the like. Improved anti-wear, or extreme pressure, qualities can be imparted by the addition of from 0.1 to 10% of a material of the type of tricresyl phosphate, for example. Further, the viscosity characteristics of the present esters can be improved by the addition of from 0.1 to 10% of a polymeric viscosity index improver such as, for example, a polymethacrylate (Acryloid), a silicone such as dimethyl-, diethyl- or methyl phenyl silicone, or an alkoxypolysiloxane. The composition can also be blended with minor amounts of other synthetic oils, such as the poly-1,2-oxyalkylene glycols and the ether and/or ester derivatives thereof. Thus, use of from 1 to 20% of a polypropylene glycol (Mol. Wt. about 800) imparts improved stability characteristics to compositions prepared from the present silicon esters and a conventional viscosity index improver of the type noted above. As rust inhibitors, there can be added from 0.1 to 10% of any one of several compounds, including metal sulfonates such as zinc dipolypropene-benzene sulfonate, sodium white oil-benzene sulfonate, and the like. Particularly attractive hydraulic fluids are those which incorporate a total of from 70 to 98% by weight of the present silicon esters, together with 0.1 to 10% each of a viscosity index improver, a rust inhibitor and (optionally) an anti-wear agent.

The examples given below illustrate methods by which the compounds of the present invention can be prepared, Example I giving a typical preparation of a trialkoxy-monochlorosilane intermediate.

EXAMPLE I

*Tri-(2-butoxy)chlorosilane*

In this operation 1 mole of SiCl₄ was charged to a flask and cooled to −15 C. To the flask was then slowly introduced, with stirring, 3.2 moles of 2-butanol, while maintaining the temperature at −10° C. When the addition of the alcohol was complete, the temperature was allowed to rise to about 20° C. and the agitation continued for three hours, with nitrogen being bubbled through the mixture to carry off the HCl formed during the reaction. The crude product was then distilled in vacuo, with the tri-(2-butoxy)chlorosilane being recovered in 78% yield as the fraction boiling at 74–80° C. at 2.5 mm. Hg.

EXAMPLE II

*Mixture of 1,5-bis[tri(2-butoxy)siloxy]-1,4-dimethyl-3-oxapentane and 1,5-bis[(2-butoxy)siloxy]-2,4-dimethyl-3-oxapentane*

In this operation 1.52 moles of tri(2-butoxy)chlorosilane was charged to a reaction flask equipped with stirrer and reflux condenser, and to this liquid was then added 355 cc. of xylene, 2 moles of pyridine and 0.68 mole of a mixture of dipropylene glycol isomers, this addition being effected over a 50-minute period in which the temperature of the reaction mixture rose to about 60° C. The mixture was then heated for 3.5 hours at 140° C., after which it was cooled, filtered, stripped of solvent and fractionated. The desired product mixture made up of 1,5 - bis[tri(2 - butoxy)siloxy] - 1,4 - dimethyl - 3 - oxapentane and the corresponding -2,4-dimethyl isomer, was recovered in 59% yield as the fraction having the following physical properties:

Boiling point _____ 200° C. at 1 mm. Hg.
Refractive index ($n$ 20/D) ___ 1.4185.
Density (20/4) _____ 0.9395.
Hydrolytic stability _____ Good.
Viscosity at:
    210° F _____ 2.53 Cs.
    100° F _____ 7.44 Cs.
    −65° F _____ 1,016 Cs.
A. S. T. M. slope (−65 to 0.68.
    210° F.)

EXAMPLE III

*1,5-bis[tri(2-butoxy)siloxy]-3-oxapentane*

The procedure followed in this preparation was essentially the same as that described above in Example I except that here there was employed 0.7 mole of the tri(2-butoxy) chlorosilane, 60 cc. of xylene, 0.3 mole of diethylene glycol and 65 grams of pyridine; further, the reaction mixture was cooled to about 10° C. as the pyridine, glycol and xylene were slowly added to the reaction vessel with stirring. After then being refluxed for three hours, the resulting reaction mixture was cooled, filtered, stripped of solvent and distilled in vacuo yielding a fraction made up of 1,5-bis[tri(2-butoxy)siloxy]-3-oxapentane and having the following physical properties:

Boiling point _____ 186–190° C. at 1 mm. Hg.
Refractive index ($n$ 20/D) _ 1.4202.
Density (20/4) _____ 0.9592.
Viscosity at:
    210° F _____ 2.13 Cs.
    100° F _____ 5.76 Cs.
    −65° F _____ 490 Cs.
A. S. T. M. slope (−65 to 0.68.
    210° F.)

EXAMPLE IV

*1,5-bis[tri(2-butoxy)siloxy]-3-thiapentane*

In this operation 1.09 moles of tri(2-butoxy)chlorosilane was reacted with 0.3 mole of thiadiethylene glycol in the presence of 60 cc. of xylene and 65 grams of pyridine, the procedure employed being that described in Example I, with the reaction mixture being maintained at a temperature of about 10° C. during the period in which the reactants were slowly combined. On then being refluxed for three hours, cooled, filtered, stripped of solvent and distilled in vacuo, there was recovered a desired 1,5-bis[tri(2-butoxy)siloxy]-3-thiapentane product in 55% yield as the fraction having the following physical properties:

| | |
|---|---|
| Boiling point | 194° C. at 1 mm. Hg. |
| Refractive index (n 20/D) | 1.4318. |
| Density (20/4) | 0.9636. |
| Viscosity at: | |
| 210° F | 2.40 Cs. |
| 100° F | 6.65 Cs. |
| −65° F | 704 Cs. |
| A. S. T. M. slope (−65 to 210° F.) | 0.67. |

EXAMPLE V

*1,5-bis[tri(2-butoxy)siloxy]-3-methyl-3-azapentane*

In this operation a mixture consisting of 60 cc. of xylene, 0.3 mole of methyl diethanol amine and 65 grams of pyridine was slowly added to a reaction flask containing 0.7 mole of tri(2-butoxy)chlorosilane, the reaction mixture being stirred and cooled to about 10° C. during the period in which the reactants were combined. The reaction mixture was then refluxed for three hours, following which the product was first washed with a 10% solution of KOH and then with water. The product was then taken up in hexane, dried over anhydrous Na2SO4, stripped and distilled in vacuo to yield the desired 1,5-bis[tri(2-butoxy)siloxy]-3-methyl-3-azapentane product as the fraction having the following physical properties:

| | |
|---|---|
| Boiling point | 180–191° C. at 1 mm. Hg. |
| Refractive index (n 20/D) | 1.4207. |
| Density (20/4) | 0.9378. |
| Viscosity at: | |
| 210° F | 2.25 Cs. |
| 100° F | 6.27 Cs. |
| −65° F | 466 Cs. |
| A. S. T. M. slope (−65 to 210° F.) | 0.69. |

We claim:

1. Silicon esters of the type having the general formula

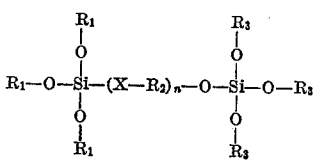

where X represents a member selected from the group consisting of —O—, —S—, —NH— and —NR4— where R4 is a lower alkyl group; the R1's and R3's are saturated aliphatic radicals of from 1 to 18 carbon atoms each; R2 represents a member selected from the group consisting of the ethylene and propylene radicals; and $n$ is an integer having a value of from 2 to 4.

2. The esters of claim 1 wherein X is an oxy group and $n$ has a value of 2.

3. Silicon esters of the type having the general formula

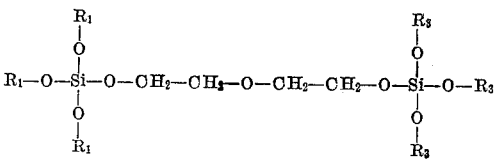

in which the R1's and R3's represent radicals selected from the group consisting of branched-chain primary alkyl, secondary alkyl and tertiary alkyl groups of from 3 to 16 carbon atoms each.

4. Silicon esters of the type having the general formula

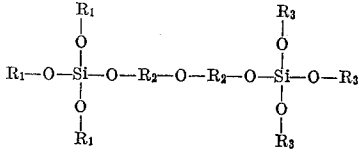

in which the R1's and R3's represent radicals selected from the group consisting of branched-chain primary alkyl, secondary alkyl and tertiary alkyl groups of from 3 to 16 carbon atoms each, and in which the R2's represent propylene radicals.

5. Silicon esters of the type having the general formula

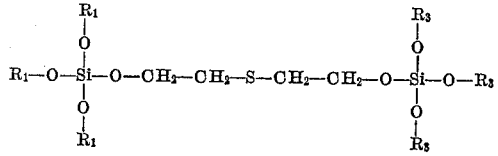

in which the R1's and R3's represent radicals selected from the group consisting of branched-chain primary alkyl, secondary alkyl and tertiary alkyl groups of from 3 to 16 carbon atoms each.

6. Silicon esters of the type having the general formula

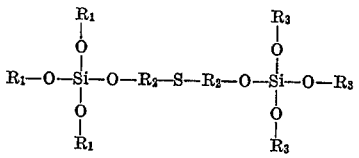

in which the R1's and R3's represent radicals selected from the group consisting of branched-chain primary alkyl, secondary alkyl and tertiary alkyl groups of from 3 to 16 carbon atoms each, and in which the R2's represent propylene radicals.

7. 1,5-bis[tri(2-butoxy)siloxy]-3-oxapentane.
8. 1,5-bis[tri(2-butoxy)siloxy]-3-thiapentane.
9. 1,5-bis[tri(2-butoxy)siloxy]-3-methyl-3-azapentane.
10. 1,5 - bis[tri(2 - butoxy)siloxy] - 1,4 - dimethyl - 3 - oxapentane.
11. 1,5 - bis[tri(2 - butoxy)siloxy] - 2,4 - dimethyl - 3 - oxapentane.

References Cited in the file of this patent

UNITED STATES PATENTS

| 2,386,793 | Hanford | Oct. 16, 1945 |
| 2,394,642 | Strain | Feb. 12, 1946 |
| 2,566,363 | Pedlow | Sept. 4, 1951 |
| 2,630,446 | Gresham | Mar. 3, 1953 |